United States Patent [19]

Davis et al.

[11] 4,205,854
[45] Jun. 3, 1980

[54] RECORD PLAYERS

[75] Inventors: David J. Davis, Wroughton; Brian P. Taylor, Swindon, both of England

[73] Assignee: Plessey Handel und Investments AG, Zug, Switzerland

[21] Appl. No.: 887,377

[22] Filed: Mar. 16, 1978

[30] Foreign Application Priority Data

Mar. 17, 1977 [GB] United Kingdom ............... 11269/77
Mar. 19, 1977 [GB] United Kingdom ............... 11745/77

[51] Int. Cl.² ................................................. G11B 3/10
[52] U.S. Cl. ................................................. 274/23 R
[58] Field of Search ............................ 274/23 R, 23 A

[56] References Cited

U.S. PATENT DOCUMENTS

| 2,954,234 | 9/1960 | Marks | 274/23 R X |
| 3,731,938 | 5/1973 | Wren | 274/23 R |
| 3,850,435 | 11/1974 | Birch | 274/23 A |
| 4,032,158 | 6/1977 | Smith et al. | 274/23 A |

FOREIGN PATENT DOCUMENTS 1361610  7/1974  United Kingdom ................. 274/23 A Primary Examiner—Harry N. Haroian
Attorney, Agent, or Firm—Fleit & Jacobson

[57] ABSTRACT

A record player having a tone-arm and a gimbal mounting for the tone arm, the gimbal mounting having bearings and at least one of the bearings having an elongate member through it for effecting limited actuation of the tone arm.

3 Claims, 6 Drawing Figures

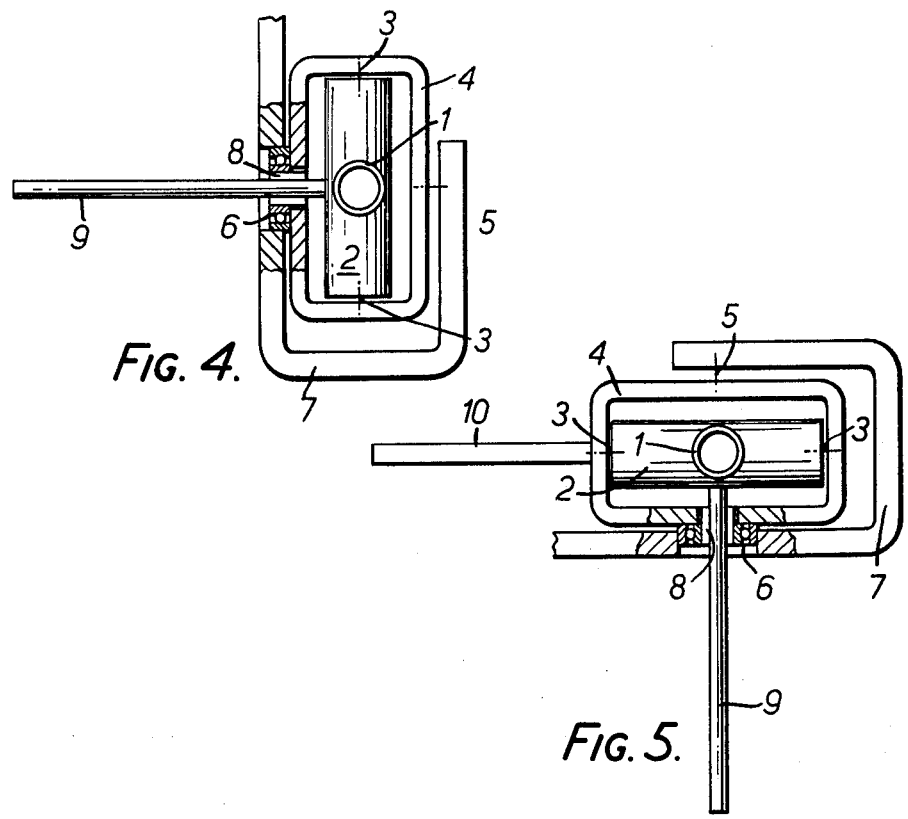
FIG. 4.
FIG. 5.
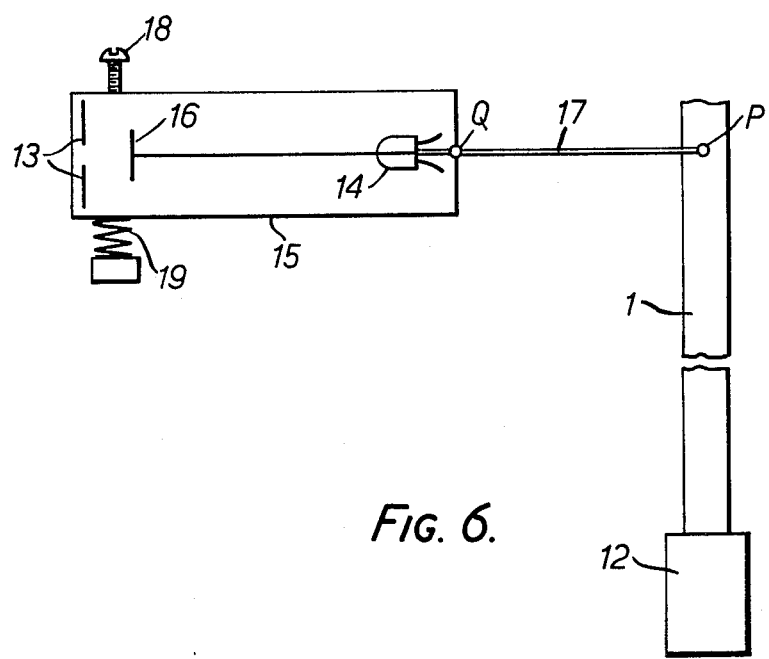
FIG. 6.

RECORD PLAYERS

This invention relates to record players having a gimbal type arm mounting. The invention has special application in disc record players incorporating so-called tangential tracking tone arm arrangements.

Accordingly, this invention provides a record player having a tone-arm and a gimbal mounting for the tone-arm, the gimbal mounting having bearings and one of the bearings having an actuating bar through it for effecting limited actuation of the tone arm, for example for cueing or position detection ourposes.

Embodiments of the invention will now be described solely by way of example and with reference to the accompanying drawings, in which;

FIGS. 4 and 5, are modified forms of the mounting of FIG. 1 as depicted in FIG. 2, which are especially suitable for use in a record player in accordance with the present invention which incorporates a tangential tracking tone arm arrangement; and FIG. 6 shows an optical error detector which is operable on a tangential tracking tone arm of a record player.

Figure 1:
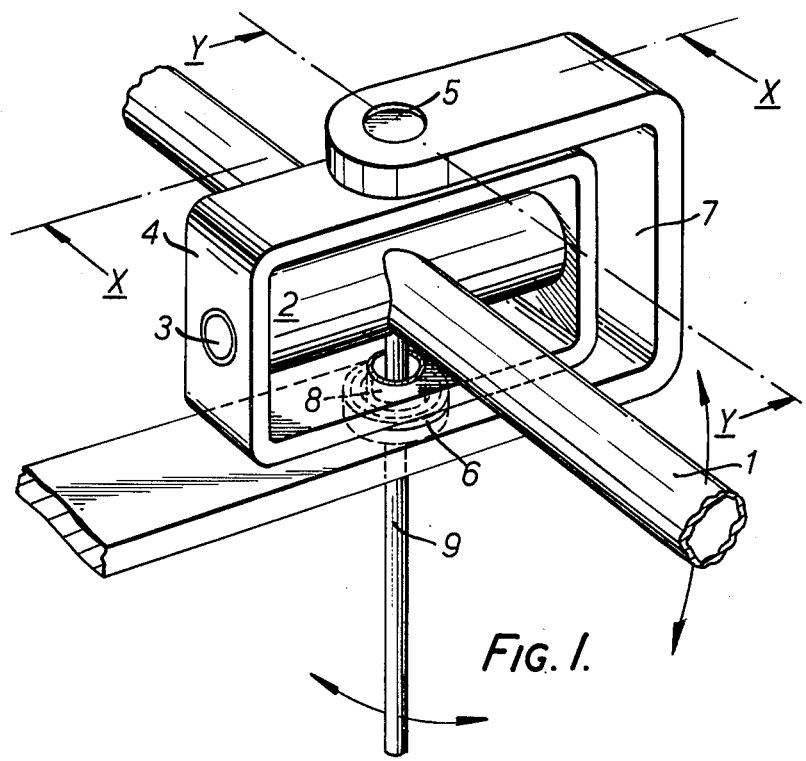
FIG. 1 is a perspective view of a gimbal type tone arm mounting for use in a record player in accordance with the present invention.
Figure 2:
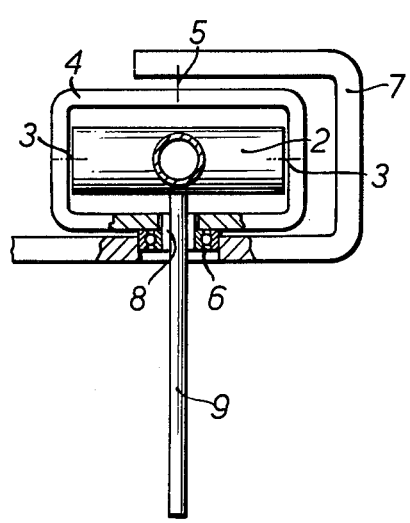
FIGS. 2 and 3, are sectional views on lines XX and YY respectively of the mounting of FIG. 1.
Figure 3:
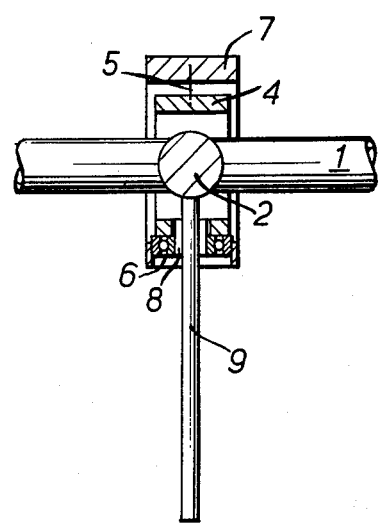

In FIGS. 1 to 3 of the drawings, there is depicted a gimbal tone arm mounting which allows cueing i.e. raising and lowering, of a tone arm 1 to be effected. The tone arm has a horizontally disposed cross member 2 which is pivotally mounted by means of pivots 3 in a generally rectangular support member 4 so the tone arm 1 may be rotated in a vertical direction. The support member 4 is itself pivotally mounted by means of two vertically disposed pivots 5 and 6 in a main support member 7 which may be fixed to the base plate of a conventional swinging tone arm record player or may be fixed to the carriage of a tangential tracking tone arm record player, the vertical pivots 5 and 6 permitting the tone arm 1 to be rotated in a horizontal direction. The pivots 5 and 6 supporting the rectangular support member 4 take the form of a simple "point" bearing 5 and a ball race type bearing 6, ball race type bearing 6 being secured in a hole in the main support member 7 and engaging a downwardly depending tubular sleeve 8 which is secured to the rectangular support member 4. The sleeve 8 is provided with a hole through it which permits an elongate member in the form of an actuating rod 9 to extend downwards through the bearing 6. The rod 9 is fixed to the tone arm 1 and it is of smaller diameter than the hole in the sleeve 8 so that it is movable in a horizontal direction relative to the main support member 7.

By causing the actuating rod 9 to be moved in a horizontal direction in line with the tone-arm 1, the tone arm 1 may be caused to be raised or lowered, thereby effecting a cueing operation. Actuation of the actuating rod 9 may be effected by means of an electrical and/or mechanical linkage (not shown) e.g. a solenoid.

As an alternative to using the gimbal mounting described with reference to FIGS. 1 to 3 for tone-arm cueing, it may be rotated 90° as depicted in FIG. 4 of the drawings so that the actuating rod 9 extends sideways from the tone-arm 1. In this position, the rod 9 may be used as a detector rod for use with the tone arm position detector of a tangential tracking tone-arm record player, an inductive form of which is disclosed in our British Patent No. 1,361,610 and an optical form of which is described below with reference to FIG. 6.

In some forms of tangential tracking tone arm record players it may be required to provide an actuating rod for cueing as in the arrangement of FIGS. 1 to 3 and also a detector rod as in the arrangement of FIG. 4, and FIG. 5 depicts a modification of the mounting shown in FIG. 2 in which a detector rod 10 is shown as extending sideways from the rectangular support member 4. It will be appreciated that if necessary the detector rod 10 may be arranged to extend in the opposite direction through a hole (not shown) in the main support member 7.

Referring to FIG. 6, the tone arm and associated optical detector is to be assumed to be carried by a carriage (not shown) which moves on one or more guide rails (not shown) by means of a servo motor or other convenient form of drive means for example in the manner disclosed in our British Patent No. 1,361,610. In the arrangement shown in FIG. 6 a tone arm 1 is shown in plan view and it is pivoted about a pivot P on a carriage (not shown). The tone arm 1 is provided on its free end with a headshell 12 which contains a stylus (not shown) which in use is arranged to make contact with a disc (not shown) carried by a turntable (not shown) of the disc record player. As the stylus follows the groove of the disc, the tone arm 1 is caused to rotate about its pivot P and this rotation may be detected and used to energise a servo-motor (not shown) which is used to move the carriage (not shown) on which the tone arm 1 is mounted so that the tone arm 1 is maintained substantially tangential to the groove of the disc.

The rotation of the tone arm 1 is detected optically by means of a pair of light detectors 13 which are arranged side-by-side and which are illuminated by means of a light source in the form of an infra-red emitter 14, the detectors 13 and light emitter 14 being contained within a shield 15. Positioned in front of the detectors 13, between them and the light emitter 14, is a light screen 16 which is carried by a screen arm 17 which is itself rigidly attached to the tone arm 1 in the vicinity of the pivot P. The shield 15 is pivotally attached by means of pivot Q on to the carriage assembly (not shown) at the end nearest the tone arm 1, the other end of the shield 15 being constrained between an adjusting screw 18 and a spring 19 which enables the detectors to be set relative to the screen 16. When the tone arm 1 is rotated about its pivot P due to the movement of the stylus carried in a headshell 12, the screen arm 17 which is rigidly attached to the tone arm 1 is caused to move correspondingly and this in turn causes the screen 16 carried by the screen arm 17 to be moved relative to the light detectors 13 so chaning their illumination by the light emitter 14.

It may be arranged in the arrangement shown, that with the tone-arm 1 in the true tangential position relative to a disc being played, the adjusting screw 18 is adjusted so that the screen 16 is disposed equally in front of the two detectors 13 whereby they are equally illuminated by the light emitter 14, so that when the tone arm is rotated from this true tangential position, the screen 16 is moved relative to the two detectors 13 causing an unbalance between their respective outputs. Conveniently, the light detectors may take the form of diodes, in which case they may be connected in back-to-back configuration, or they may be connected to the positive and negative inputs respectively of a differential amplifier. The error signal thus obtained may be fed to an amplifier and filter, the output from which may be applied to a servo-motor to drive the carriage to once again effect true tangential tracking.

There is a gain factor associated with the arrangement described with reference to FIG. 6, which gain factor depends on the lengths of the arms and the position of the screen. The first gain factor is the ratio of screen arm 17 length to tone arm 1 length, i.e. a given amount of stylus movement gives a corresponding movement of the screen 16 times the first gain factor. The second gain factor depends on the position of the screen 16 relative to the infra red emitter 14 and optical detectors 13, i.e. if the screen 16 is close to the optical detectors 13 the second gain factor is one, but if the screen 16 is mid-way then the second gain factor is two. The total gain factor is the product of the first and second gain factors.

An alternative arrangement to that shown in FIG. 6, would be to have a fixed screen and the optical assembly attached to an optical arm which is attached to the tone arm. The outputs would be the same for the same given inputs.

The sensitivity of such a system can be arranged to be high. This therefore has applications for audio and video disc tracking systems.

As well as being used for effecting tangentially tracking of a tone arm, the optical detector arrangement described with reference to FIG. 6 may be used to detect when the stylus of the tone arm has entered the fast run-out groove of a record, which will cause the tone-arm 1 to be rotated at a relatively fast rate about its pivot P and this may be used as an auto-trip mechanism to effect lift-off of the tone-arm from the disc in the usual way.

It is to be appreciated that various modifications may be made to the gimbal mountings described without affecting the basic operation. For example, the actuating rod 9 in the arrangements of FIGS. 1 to 3 and FIG. 5 may be hollow so that connecting leads may be passed through it and the tone arm 1 to the usual tone-arm cartridge (not shown). In other respects, the main parts of the record player will usually be standard so that the record player will include the usual record turn table, base plate motor and a belt or gear drive for the record turn table.

What we claim is:

1. A record player having a tone arm and a gimbal mounting for the tone arm, the gimbal mounting having bearings and at least one of the bearings having a first elongate member through it, the elongate member being attached at one end to the tone arm with the center line of the elongate member intersecting the point of rotation of the tone arm, and the said at least one bearing having sufficient clearance to allow the elongate member to move angularly within it.

2. A record player according to claim 1, including a second elongate member which extends substantially at right angles to the first elongate member.

3. A record player according to claim 1 including an optical error detector and means for interconnecting said optical error detector with the tone arm.

* * * * *